Oct. 18, 1960     W. H. CARTER, JR     2,956,489
CINEPHOTOMICROGRAPH

Filed March 21, 1956     3 Sheets-Sheet 1

William H. Carter, Jr.
INVENTOR.

BY Wm. E. Ford

ATTORNEY

United States Patent Office 2,956,489
Patented Oct. 18, 1960

2,956,489

CINEPHOTOMICROGRAPH

William H. Carter, Jr., 3103 Kettering Drive,
Houston, Tex.

Filed Mar. 21, 1956, Ser. No. 572,921

5 Claims. (Cl. 95—11.5)

This invention relates to a control device for determining by pre-selection the number of cycles a sequence of events will occur in an apparatus during any time interval and also for determining within each cycle the allotment of time to successive occurrences. In particular the invention relates to such a control device as applied to the taking of motion pictures, at pre-determined intervals, of minute reactions, as the growth of cells, the images photographed being enlarged by means of a microscope and the camera parts and motive parts driving the camera, and transmitting thereto control of its time interval per cycle and also control of the time allotment to successive occurrences within each cycle, being brought to distinct inaction during exposure whereby vibration, which otherwise could cause a blurred picture, is minimized.

The need for this invention is obvious when photographing such minute reactions as cell growth where a microscope is interposed between film and image to support the image which is in turn positioned between light source and microscope lens. In such photography, should the camera parts remain in motion to vibrate the camera so that relative vibration may take place between the camera and the miscroscope and the image supported thereby, and considering the minuteness of the motion photographed, blurred images can well result, and have characteristically resulted. The necessity for driving the camera with a means for controlling its time interval per cycle and the time lapse or allotment to successive occurrences within each cycle requires a mechanism in adjacency with the camera, as a camera drive motor, and this added mechanism would well increase the problem of vibration.

The mounting of the camera and its camera drive motor and the microscope and image supported thereby on a unitary stand or support of substantial mass can minimize relative vibration therebetween and when the moving parts of camera and camera drive motor are brought to distinct inaction during the full time interval of film exposure relative vibration is substantially further minimized.

A time lapse or time allotment control applicable to this class of photography also has application in other fields as well as where pre-selection is to be made of the number of cycles a sequence of events is to occur during a time interval, and also the time lapse or time allotment to the successive occurrences within the cycle must be pre-determined. Thus the invention can have application to conditions where in the cycle there must take place some critical occurrence or lapse of action to extend over a pre-selected time interval.

It is consequently a primary object of this invention to provide a time lapse or allotment control providing pre-selection of the number of cycles a sequence of events will occur in an apparatus during a pre-determined time interval and also providing for lapse of time allocated to the succession of occurrence in the apparatus during a cycle.

It is another primary object of this invention to provide a time lapse or allotment control applicable to cinephotomicrographs or mechanism for taking motion pictures during exposure periods occupying pre-determined lapses of time within a cycle with all camera and camera drive motor parts distinctly stopped to minimize vibration, such control also including means for selecting the number of such cycles to occur during a pre-determined time interval.

It is yet a further object of this invention to provide a time lapse or allotment control of this class enabled to accomplish the purpose thereof with a minimum of control devices comprising two continuously running motors controlling the operation of a driving means and associated apparatus, one motor controlling the number of cycles within a pre-determined time interval a succession of events will occur in relation to the operation of the driving means and associated apparatus and the other motor controlling the allotment of time or time lapse to the succession of events occurring within a cycle.

It is still a further object of this invention to provide a cinephotomicrograph of this class in which the camera, camera drive, and image supporting microscope are firmly mounted on a base or stand of substantial mass whereby vibration effects are minimized.

Other and further objects will be apparent when the specification is considered in connection with the drawings in which.

Figure 1:
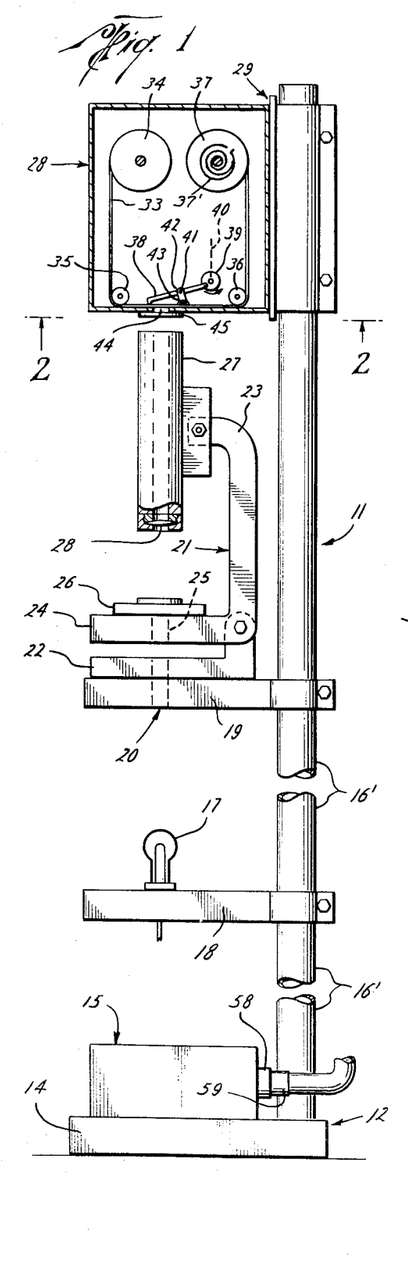
Fig. 1 is an elevation of a cinephotomicrograph showing the arrangement of the mechanism included in an application of this invention.

Referring in detail to the drawings which disclose a preferred form of the invention, the general arrangement of a cinemicrophotograph 11 is shown in Fig. 1. It comprises a stand 12 having a base 14 on which is mounted a time lapse drive control 15. A post 16' upstands from the base 14 and a light 17 is mounted on a table 18 which is clamped to the post 16'. A table 19 is clamped to the post 16' and has therein a window 20 vertically above the light 17. A microscope 21 has a base 22 positioned upon the table 19 and a bracket 23 is pivotally adjustably connected to the base 22 and such bracket includes a slide support 24 having a window 25 therein vertically above the open space between the forked legs comprising the vertical members of the base 22, such open space being vertically above the window 20. A slide 26 having thereon matter to be photographed is carried by the support 24. A microscope tube 27 is slidably adjustably mounted on the upper vertically extending arm of the bracket 23 and has a lens 28 therein directly vertically above the slide 26.

Figure 2:
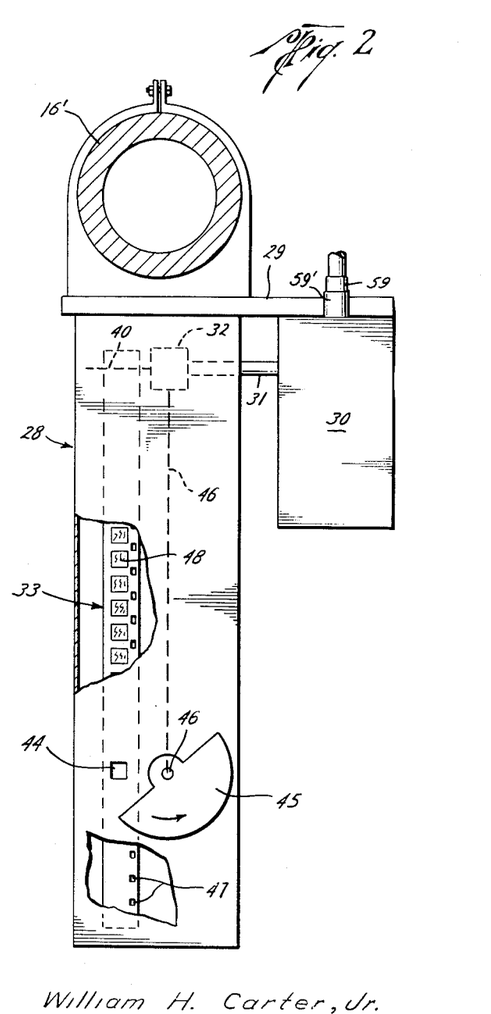
Fig. 2 is a sectional bottom view taken along line 2—2 of Fig. 1.

Referring in detail to the upper part of Fig. 1 and to Fig. 2, in which showings more or less diagrammatical are employed to designate conventional parts and their arrangement, a camera 28 is shown mounted to a base plate 29 which in turn is vertically adjustably mounted to the post or column 16'. A camera drive motor 30 is shown in bottom view, Fig. 2. Although not shown in Fig. 1, this motor is obviously mounted on the base plate 29 which is shown vertically extending in Fig. 1. Such motor 30 is connected to drive a conventional camera projector transmission 32 by means of a drive shaft 31 extending from the camera drive motor 30 to the camera 28.

A film 33 is fed from a reel 34 rotatably mounted within the camera 28 over a roller 35 also rotatably mounted therein, and from this roller 35 such film extends horizontally along the lower inner surface of the camera to an opposite roller 36 which is also rotatably mounted in the camera and from this roller 36 the film extends upwardly to a reel 37 which receives the film thereon as it is unwound. Conventional spring means 37' indicated diagrammatically in Fig. 1 and included as part of the transmission 32 shown in Fig. 2 is provided to insure that the film travels with enough tension to acts as receiving reel, tension is maintained thereagainst to insure that tthe film travels with enough tension to wind up firmly and evenly on the reel receiving it. As indicated in Fig. 1, a claw 38 is shown having one end crank-connected to a crank element 39 mounted on a conventional projector shaft 40 which is indicated diagrammatically in Fig. 1 by dotted lines, such shaft 40 also being thus indicated in Fig. 2 in which it is shown as being driven from the transmission 32. Referring now to Fig. 1, the claw 38 is pivotally mounted on a pin 41 which extends from an arm 42 which is pivotally mounted on a pin 43 within the camera. This claw assembly structure is conventional for moving the film to be hereinbelow described.

A window 44 is provided in the bottom of the camera 28 and a shutter 45 is mounted externally of, and below the bottom of the camera on the lower end of a shaft 46 which extends from within the camera downwardly through the bottom thereof, such shaft 46 being indicated in Fig. 2 as being driven by the transmission 32 within the camera 28. The film 33 has holes 47 equally spaced apart therein, and in the case of standard 16 millimeter movie film such holes are spaced apart about 7.5 millimeters. In operation, upon each revolution of the shaft 40 the claw 38 engages in a hole 47 and drags the film a distance equal to hole spacing, this distance being slightly greater than the width of the window 44. Thus after exposure the film appears with a succession of images thereon equal in width to window width and with the spacing between images equal to the difference between film travel during each claw engagement and window width. The film then appears divided into successive exposures termed frames 48, each frame in longitudinal dimension being equal to window width.

It can thus be seen that when the claw 38 drags a frame of film before the window and stops and the shutter 46 uncovers the window 44, the light 17 being turned on, the image of any object on the slide 26 is magnified by the microscope lens 28 and projected in magnified size through the window 44 and upon the film.

As shown diagrammatically in Fig. 3 a source of electric power is connected by a pair of conductors 51, 52 to supply electric power to the assembly termed the time lapse drive control unit 15, such unit being indicated as the diagrammatic assembly comprising the right portion of diagrammatic Fig. 3, and being described hereinabove as shown supported by the base 14 in Fig. 1. A fan type switch 49 is electrically connected to the conductor 51 and is designed to be swept successively over contacts 1, 2, 4, 8 and 16 so that such are additively cut in circuit therewith as the conductor arc 53 follows the arm 49 to which it is connected and comes to rest upon such contacts.

The contact 1 is connected by means of a conductor I to a contact $a$ on a disc having equally radially spaced apart thereon, successively positioned clockwise in a circle, contacts $a$, $b$–$d$, $e$, $f$, $g$, $h$, $i$ and $j$–$p$. Similarly the contacts $i$, $e$, $g$, and $h$ are respectively connected by conductors II, IV, VIII, and XVI, to the fan switch contacts 2, 4, 8, and 16 respectively. The contact $e$ is connected to its opposite contact $m$ by a conductor as an arcuate bar X; and outwardly of the arcuate conductor bar X and parallel thereto an arcuate conductor bar Y is provided to connect contact points $k$ and $g$, such bar also having contact points $o'$ and $c'$ thereon intermediate the contact points $k$ and $g$, and conductors connect these contact points $o'$ and $c'$ with the contact points $o$ and $c$, respectively, in the circle of contact points on the face of disc 84 to be swept by the arm 56, as will be hereinafter described. Outwardly of the arcuate conductor bar Y, and parallel thereto, the arcuate conductor bar Z is provided to connect contact points $j$ and $h$, such bar also having thereon intermediate the contacts $j$ and $h$, the contact points $11'$, $n'$, $p'$, $b'$, $d'$, and $f'$, and suitable conductors connect their contact points to contact points 11, $n$, $p$, $b$, $d$, and $f$.

A motor 54 which may be a synchronous motor, as of the type used for an electric clock and operative at some predetermined speed, as 1 r.p.m., has one side of its windings connected to a conductor 51' which in turn extends from the A.C. power conductor 51, which may be termed the positive or "hot" side of the power line. Oppositely a conductor 52' extends from the negative, neutral, or "ground" conductor 52 of the power line to the other side of the windings of the motor 54.

Figures 3, 4:
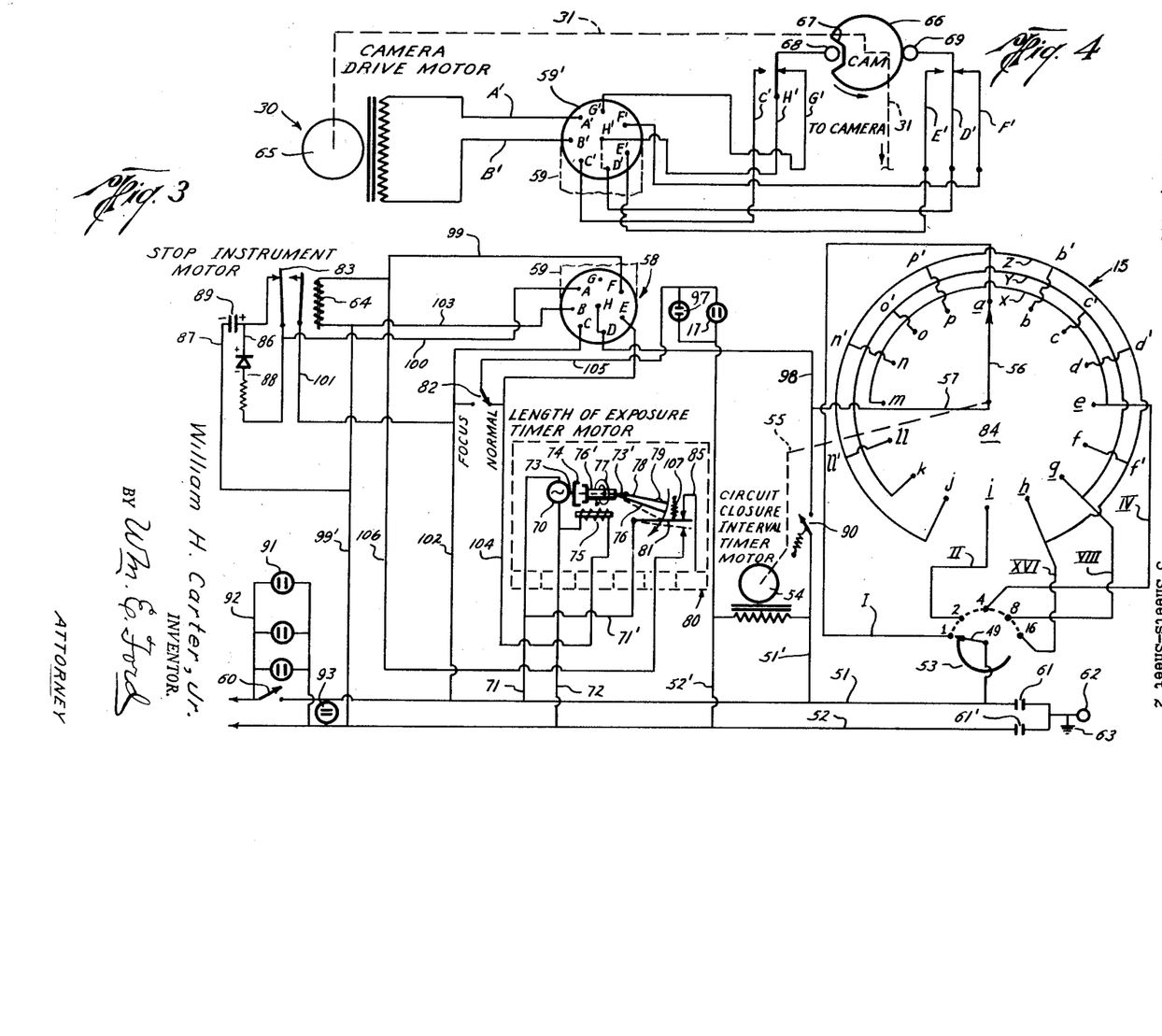
Fig. 3 is a diagram of the time lapse drive control unit and circuits included in the application of the invention shown in Fig. 1.
Fig. 4 is a diagram of the camera drive motor and circuits included in the application of invention shown in Fig. 1.

The shaft 55 of the motor 54 has an arm 56 thereon which rotates with such shaft 55, and a stationary conductor 57 is mounted in conventional manner to carry current from the arm to a circuit completing conductor 98 in a plug or receptacle 58 at the time lapse drive control unit 15, such receptacle 58 being shown in the upper central part of Fig. 3 and as extending from the time lapse drive control unit 15 shown on the base 14 in Fig. 1, the circuit completion effected by the conductor D to be hereinbelow described.

Thus when the fan type switch 49 is set on contact 1, and the power conductor line switch 60 is closed, circuit is completed through the conductor I, contact $a$, arm 56, and conductor 57 to the circuit completing conductor 98 once in each revolution of the shaft 55. If the switch 49 is moved to the contact 2 then in each revolution of the shaft 55 circuit is completed to the conductor 98 twice, once as the arm 56 sweeps contact $a$ and once as it sweeps contact $i$. If the switch is moved to contact 4 circuit is completed to the conductor 98 four times per shaft revolution as the arm 56 sweeps contacts $a$, $e$, $i$ and $m$. Then if the switch 49 is moved to contact 8 circuit will be completed eight times per shaft revolution as the arm 56 sweeps contacts $a$, $c$, $e$, $g$, $i$, $k$, $m$, and $o$. It follows that when the switch 49 is moved to contact 16 circuit will be completed sixteen times per shaft revolution as the arm 56 sweeps each of the sixteen contacts from $a$ to $p$. Thus the contact on which the fan switch 49 is positioned selectively determines the number of circuit completions through the arm 56 per revolution of the shaft 55.

Two condensers 61, 61', one from each of the respective sides of the A.C. power line 51, 52, are shown and provided as line filters and are indicated as being grounded at 63, to the chassis of the unit 15, and as grounded at 62 to a grounding binding post.

The conductor 98 in the time lapse drive control unit, more shortly termed the time lapse unit 15, extends to a prong receiving conductor end also indicated as D in a receptacle 58, shown in the upper, central part of Fig. 3, and also shown in Fig. 1, and this conductor end D is cross-connected by a conventional conductor means to a similar prong receiving conductor end, such conductor means together with such end, being indicated as H in such receptacle. The receptacle 58 also has therein similar prong receiving conductor ends A, B, C, E, F, and G to be hereinbelow described. An insulative cable 59 is indicated in dotted lines as extending upwardly from the receptacle 58 in the upper, central part of Fig. 3, and is also shown in Fig. 1, and such cable 59 is also indicated in dotted lines as extending downwardly from a receptacle 59', as shown in Figs. 2 and 4. Such cable has conductors therein which extend between the receptacle 59' in Fig. 4 and the receptacle 58 in Fig. 3. These conductors terminate in Fig. 3 in prongs insertable in the hereinabove described prong receiving conductor ends A, B, C, D, E, F, G, and H, and in Fig. 4 they terminate in prongs insertable respectively in correspondingly designated prong receiving conductor ends A', B', C', D', E', F', G', and H' shown in the receptacle 59' in Fig. 4. As diagrammatically shown no effort is made to show the individual conductors in the cable 59 as such extends between the receptacles 58 and 59' in Figs. 3 and 4, respectively, or in Figs. 1 and 2, respectively, but such conductors could be properly designated AA', BB', CC', DD', EE', FF', GG', and HH' within the original scope of the drawings and thus the prong insert at either end thereof would be designated by the same reference character as the prong receiving conductor end in the respective receptacles 58, 59'.

As shown in Fig. 4, conductors A', B', C', D', E', F', G', and H' extend respectively from the correspondingly designated prong receiving conductor ends A', B', C', D', E', F', G', and H'. Such conductors will be hereinbelow described, and with their immediate relation to the camera drive motor unit 30 as indicated diagrammatically in Fig. 4 and as shown in Figs. 1 and 2. Referring to Fig. 4, a camera drive motor 65 within the camera drive motor unit 30 is shown as having a shaft 31 extending therefrom having a cam 66 mounted thereon to bear against a microswitch 69 when the motor 65 is stopped and during part of its rotative cycle. In this position in which the cam 66 bears thereagainst, the microswitch 69 circuit is closed between a conductor D' which extends from the correspondingly designated prong receiving conductor end D' in the receptacle 59' of such unit, and a conductor F', which extends to the correspondingly designated prong receiving conductor end F' in such receptacle 59'.

By way of conductor FF' in the cable 59 the prong receiving conductor end F' in the camera drive receptacle 59' is connected to the prong receiving conductor end F in the time lapse unit receptacle 58, from which a conductor 99 extends to include the windings of a relay 64 and a return conductor 99' extends therefrom to complete circuit to the power line conductor 52. Thus there is a complete circuit from the power line conductor 51 through the conductor 98, the interconnected prong receiving conductor ends D and H, the cable conductor HH; the interconnected prong receiving conductor ends H' and D', the conductor D', the conductor F', the prong receiving conductor end F', the interconnecting cable conductor FF', the prong receiving conductor end F, the conductor 99, the energized relay windings 64, and the return conductor 99', to the power line conductor 52.

When the relay 64 is thus energized a switch 83 is thrown from the normal position shown in Fig. 3 to close circuit between a conductor 100 leading from the prong receiving conductor end A in the time lapse unit receptacle 58 to a conductor 101 in the time lapse unit which in turn connects into a conductor 102 therein which extends from the prong receiving conductor end C in the time lapse unit receptacle 58 to the power line conductor 51.

By way of the cable 59 the prong receiving conductor end A in the time lapse unit receptacle 58 is connected to the prong receiving conductor end A' in the camera drive unit receptacle 59' and a conductor A' extends therefrom to one side of the windings of the camera drive motor 65, the opposite side of such windings being connected by means of a conductor B' to the prong receiving conductor end B' in the camera drive unit receptacle 59'. Then by way of the conductor BB' of the cable 59 the prong receiving conductor end B' in the camera drive unit 30 is connected to the prong receiving conductor end B in the time lapse unit receptacle 58 from which a conductor 103 extends to connect with the conductor 99 in such unit and at its junction with the conductor 99' which connects with the power line conductor 52. Thus the relay 64, upon operating the switch 83 as hereinabove described, has completed circuit between the power line conductors 51 and 52 which includes therein the windings of the camera drive motor 65 which is in parallel with the circuit including such relay, and the motor 65 is thus started and rotates its shaft 31.

While the arrow or arm 56 on the disc 84 is in process of passing over the contact $a$ to close circuit to the power line conductor 51, the rotation of the camera drive motor shaft 31 and of the cam 66 affixed thereto lifts the microswitch 68 out of the slot 67 to break contact with the conductor G' in the camera drive unit 30 and close contact between the conductor H' and the conductor C' which extends to the prong receiving conductor end C' in the camera drive unit receptacle 59'. By way of the conductor CC' in the cable 59, as hereinabove described, the prong receiving conductor end C' in the camera drive receptacle 59' is connected with the prong receiving conductor end C in the time lapse unit receptacle 58 and from the prong receiving conductor end C a conductor 102 in the time lapse unit completes circuit to the power line conductor 51.

When the cam 66 rotates to force the microswitch 68 out of the cam slot 67, the microswitch 68 circuit connects the conductor H' with the conductor C'. Following circuit, the conductor H' extends to the prong receiving conductor end H' in the receptacle 59', and this conductor end H' is cross-tied to the prong receiving conductor end D' by means of the conductor D'H' shown in dotted lines in Fig. 4. From the prong receiving conductor end D' the conductor D' extends to the microswitch 69, which maintains position on the cam surface as shown in Fig. 4 for a time after the cam 66 has rotated to move the microswitch 68 out of the cam slot 67, and prior to the time the microswitch 69 falls into the cam slot 67. Thus, during this previous period, circuit is closed through the microswitch 69 to the conductor F', and from that point the circuit extends to include the windings of the relay 64 in completing circuit to the power line 52, as set forth hereinabove in column 5. Thus during the period after the microswitch 68 is forced from the cam slot 67 but before the microswitch 69 falls into such cam slot, the relay 64 remains energized and thus keeps closed the circuit through the windings of the motor 65 when the arm 56 is rotated off the contact $a$ to break the hereinabove described, initially established circuit through such windings and the camera drive motor 65 continues running.

When the cam 66 has rotated to place the slot 67 therein beneath the microswitch 69, the microswitch, as urged by its normal resiliency to the left as shown in Fig. 4, falls into the slot 67 and contact is broken with the conductor F' and circuit is completed between the conductor D' and the conductor E' in the camera drive unit. From the microswitch 69 circuit may now be traced back to the power line conductor 51 by way of the conductor D' to the prong receiving conductor end D' in the camera drive receptacle 59', then by way of the cross-connection D'H' between the prong receiving conductor ends D' and H' circuit is continued from the prong receiving conductor end H' and from this point circuit is extended on through the conductor H' to the microswitch 68 and therefrom by the conductor C' to the prong receiving conductor end C' in the receptacle 59' and thence by the conductor CC' in the cable 59 to the time lapse unit receptacle 58 and from the prong receiving conductor end C therein finally by way of the conductor 102 circuit is completed to the power line conductor 51.

Tracing in opposite direction from the microswitch 69 than in the foregoing paragraph, circuit is carried through to the opposite power line conductor 52 from the microswitch 69 through the conductor E' to the prong receiving conductor end E' in the camera drive unit receptacle 59' and through the conductor EE' of the cable 59 to the prong receiving conductor end E in the time lapse unit receptacle 58. From the conductor end E a conductor 104 extends to the windings of a solenoid 75 which in turn ties into a conductor 72 which connects into the power line conductor 52. When energized the solenoid 75 engages a clutch 74 on a shaft 73 extending from a continuously running motor 70 which is empowered by a conductor 71 extending from the power line conductor 51 to one side of its windings and by the conductor 72 extending from the other side of its windings to the power line conductor 52, the conductor 72 having been hereinabove described as the conductor into which the conductor 104 is connected.

From the conductor 104 in the time lapse unit 15 a circuit parallel to the circuit of the conductor 104 extends therefrom in the form of a conductor 105, which includes in its circuit a switch 82 shown in Fig. 3 in the position in which it is normally closed, such circuit continuing from the switch 82 to include therein the light 17, also shown in Fig. 1, which supplies illumination during exposure, the circuit of conductor 105 being completed from the light 17 to the conductor 52' at a point between its connection to the power line conductor 52 and its connection to one end of the windings of the motor 54.

With the clutch 74 engaged, rotation of the continuously running motor 70 is transmitted through the shaft 73 to a shaft 73' termed the timer shaft co-axially aligned with the motor shaft 73. Such shaft 73' has an arm or pointer 78 thereon which is frictionally rotatable about the shaft end 73' and frictionally positionable upon the chassis, not shown, of the motor unit 70 at any pre-determined azimuth from a position representing the closed position of a switch 81 which has its end electrically connected to a conductor 71', such switch 81 in its closed position establishing contact with a conductor 106. From the switch 81 the conductor 71' extends to the conductor 71 which in turn connects the power line conductor 51 to the motor 70. Circuit to the opposite power line conductor 52 is completed from the contact point of the switch 81 with the conductor 106, by way of such conductor 106 to the conductor 99 on one side of the windings of the relay 64, and thence by way of such conductor 99 and the windings of the relay 64 through the conductor 99' to such opposite power line conductor 52.

As shown diagrammatically in Fig. 3 a clutch hub 76' is slidable upon the shaft 73'. Such clutch hub 76' has an arm 76 radially extending therefrom. A torsion spring 77 has one end fixed at a spaced point from the shaft 73' and extends spirally around the clutch hub 76' and has its other end fixed to the clutch hub 76'. The torsion spring 77 as thus connected normally rotates the clutch hub 76' and the arm 76 fixed thereto in direction about the timer shaft 73' to bring the arm 76 to bear against a stop 79 on the arm or pointer 78 which is frictionally positioned adjacent thereto on the shaft 73'.

However when the microswitch 69 closes circuit between the camera drive unit conductors D' and E' and circuit is closed to energize the solenoid 75, as has been hereinabove described the solenoid 75 is adapted when energized to slide the clutch hub 76' to the left as shown in Fig. 3, and the clutch hub 76', by conventional construction, when in this leftward position is adapted for engagement with the clutch 74, and when in this position the conventional construction of the clutch 74, the clutch hub 76', and the timer shaft 73' is such that they are connected to rotate together. As thus connected the clutch hub 76' and the arm 76 connected thereto rotate together, until the arm 76 contacts the switch 81 to move it to closed position to complete circuit to re-energize the relay 64 as hereinabove described. Such switch 81 is normally held open by a spring 107 having one end connected to the switch and its other end anchored. When the clutch hub 76' is thus engaged the torsion spring 77 is stretched in axial direction between its end connections while it winds up about the hub 76' as rotation takes place.

When the relay 64 is thus energized it operates the switch 83 to complete circuit between the conductors 100 and 101 from which circuit is completed to the power line conductor 51 by way of the conductor 102, while from the conductor 100 circuit is completed, as hereinabove described, through to the windings of the motor 65 and thence back to the time lapse drive control unit 15 and by way of the conductors 103 and 99' to the power line conductor 52. This starts the camera drive motor 65 to rotate the cam 66 to lift the microswitch 69 from the slot 67 and break circuit between the conductors D' and E' and restore circuit between the conductors D' and F'. Thereafter the camera drive motor 65 continues running as its windings are included in the circuit extending from the power line conductor 51 by way of conductors 102 and 101 to the switch 83 and from such switch by way of conductor 100 to the conductor end A and through to the camera drive unit and by way of the conductor end A' and the correspondingly designated conductor A' to the camera drive motor windings from which the conductor B' extends to the conductor end B' and therefrom to the conductor end B of the time lapse control unit and by way of the conductor 103 and the conductor 99' to the power line 52.

However when the microswitch 69 breaks circuit between the conductors D' and E', circuit to the solenoid 75 is broken and also to the light 17, so that the light 17 goes out and at the same time clutch connection is broken between the timer shaft 73' and the motor shaft 73. When de-energized the solenoid 75 slides the clutch hub 76' to the right as shown in Fig. 3 and clutch connection between the shafts 73 and 73' is broken, and also the clutch hub 76' is disengaged from connection to rotate with the shaft 73'. The torsion spring 77 may thus return the arm 76 against the stop 79 on the pointer 78, and the spring 107 may return the switch 81 to its initial position against a contact 85.

The camera drive motor now continues running until the microswitch 68 is urged by the normal resiliency of the conductor H' into the cam slot 67 just after the arm 56 on the circuit closer interval timer motor 54 establishes contact with the next contact from which circuit may be completed through the fan switch 49 as a new cycle of operation commences.

Having described in general the operative cycle of the invention its applicability to time lapse photography as compared with conventional time lapse photographic systems may be considered.

Conventionally the slowest standard silent motion picture rate is accepted as the taking of as few as 16 frames per second, and any rate slower than this is termed time lapse photography in which rates such as one frame per second, one frame per minute, or for example one frame per hour may be taken. The basic principle of time lapse photography invvolves the making of a series of still photographs on a strip of perforated, sensitized film at long time intervals apart, standard 70 mm., 35 mm., or 16 mm. motion picture film being best employable for this purpose, together with the cameras and their film transport mechanisms with which such film is used.

After a series of pictures are taken at the spaced apart intervals of time lapse photography they are projected rapidly to obtain a compression of time relative to actual occurrence time so that events occurring over a long period, such as physical changes in size, color, appearance, or position may be observed in relatively short periods of time. This technique is frequently used to follow the growth of plants and the blooming of flowers and in recent times has been extended with good results by the medical profession to observe the growth and behavior of certain disease cells.

In conventional time lapse photography the same motor which drives the film transport operates the shutter and motion is so correlated that the shutter first begins rotating as the film starts in transport. Then by the time film transport ends the shutter has been rotated far enough to begin uncovering the window so that impression begins on the film on the side of the window first uncovered. Illumination is commonly provided in point of time coincident with the starting of the motor or shortly thereafter and at least prior to the start of uncovering the window. As the shutter continues rotating it uncovers more and more of the window until it is all uncovered. Then during the period of full exposure the shutter is rotating upon the camera while the window remains fully open and then the shutter returns and first begins to cover the part of the window first uncovered and moves over and covers the window, last covering the part of the window last uncovered.

Thus although every part of the film is exposed the same total length of time the part of the film under the part of the window first uncovered is first impressed and the part of the film under the part of the window last uncovered is last impressed with the result that an unevenness of impression occurs between these parts due to the differences in exposure thereon in point of time.

In these conventional time lapse photographic systems the motor runs continuously during exposure and is stopped, as by a time actuated solenoid, when the shutter has been turned one complete revolution. The period the motor is stopped plus the time required for one revolution of the shutter together make up the time lapse cycle, or the time per photographed frame, and obviously this cycle must be greater in length of time than the exposure interval.

Since the shutter and film transport are driven by a transmission, as a gear train, or other variable load mechanism, there is a continuous vibration occurring in the camera, and this vibration if transmitted to the optical system, as the microscope, would cause movement of the optical image as projected on the film, and result in a multiplicity of images and a fuzzy picture. This is unusually objectionable in time lapse photography since in most cases relatively long exposure intervals or time exposures are required because of the insufficient illumination obtainable in short exposures.

In cases where a conventional time lapse mechanism is to be used in connection with a microscope, the vibration set up by the running of the camera is transmitted to the microscope and/or the subject material, and is multiplied at the film plane in direct proportion to the magnification of the microscope. Therefore as an exaggerated condition a vibration of .001" would become one inch if the magnification of the microscope were 1000×. Since the images usually used are relatively small at the film plane and high resolution is necessary to secure a usable image, vibration in any degree whatsoever will tend to reduce the sharpness or definition of the time exposure.

As a consequence this invention, through employing the structures hereinabove described, or structures of equivalent function, provides a time lapse mechanism in which the camera driving operation is separated into two distinct steps, with full stoppage intervening and with the period of full stoppage being determinable by pre-selection. The pre-selected period of full stoppage is not determined by the length of the camera operating period so that it has to be some time interval less than the operating period, as in the case of conventional time lapse photography, but such full stoppage period may be any desired period within the ranges of practicality.

At the time full stoppage of the camera drive mechanism takes place, the shutter has passed completely from over the window and the window is fully open, and at this time the light is turned on. It follows that when the full stoppage period ends, the light is turned off before the shutter has moved to start occluding the window, and thus every part of the film of a frame receives the full light impression at the same time.

The rate of rotation of the camera drive motor need have no special relation to the rate of rotation of the synchronous motor 54 with the exception that consideration should be given to a practical time interval within the mechanical limitations of camera shutter and film movement, practical time exposure interval, and space and time limitations affecting the number of selector contacts which may be provided about the disc 84 in keeping with a practical speed of the circuit closure interval timer motor 54 and its space limitations.

Typical of a camera drive motor speed would be one which might rotate the shaft 31 approximately 60 revolutions per minute so that the camera functions of a complete cycle of shutter and film movement operation might take place in about one second. Typical of a time exposure interval would be one of duration of about two seconds. Considering synchronous motor characteristics a practical circuit closure interval timer motor could have a speed of one revolution per minute, and a practical selector disc arrangement could be one in which selections could be made of 1, 2, 4, 8 or 16 circuit closures per revolution of the motor 54, as shown in Fig. 3. Under these conditions the chart hereinbelow sets forth relations:

| Circuit Closures Per Timer Motor Revolution | Camera Motor Rotation Between Micro-switches, sec. | Exposure Interval, sec. | Camera Motor Rotation Between Micro-switches, sec. | Camera Stoppage Between Circuit Closures or Waiting Interval, sec. | Total Time Per Cycle or Time Lapse Interval, sec. |
|---|---|---|---|---|---|
| 1 | ½ | 2 | ½ | 57 | 60 |
| 2 | ½ | 2 | ½ | 27 | 30 |
| 4 | ½ | 2 | ½ | 12 | 15 |
| 8 | ½ | 2 | ½ | 4½ | 7½ |
| 16 | ½ | 2 | ½ | ¾ | 3¾ |

Figure 5:
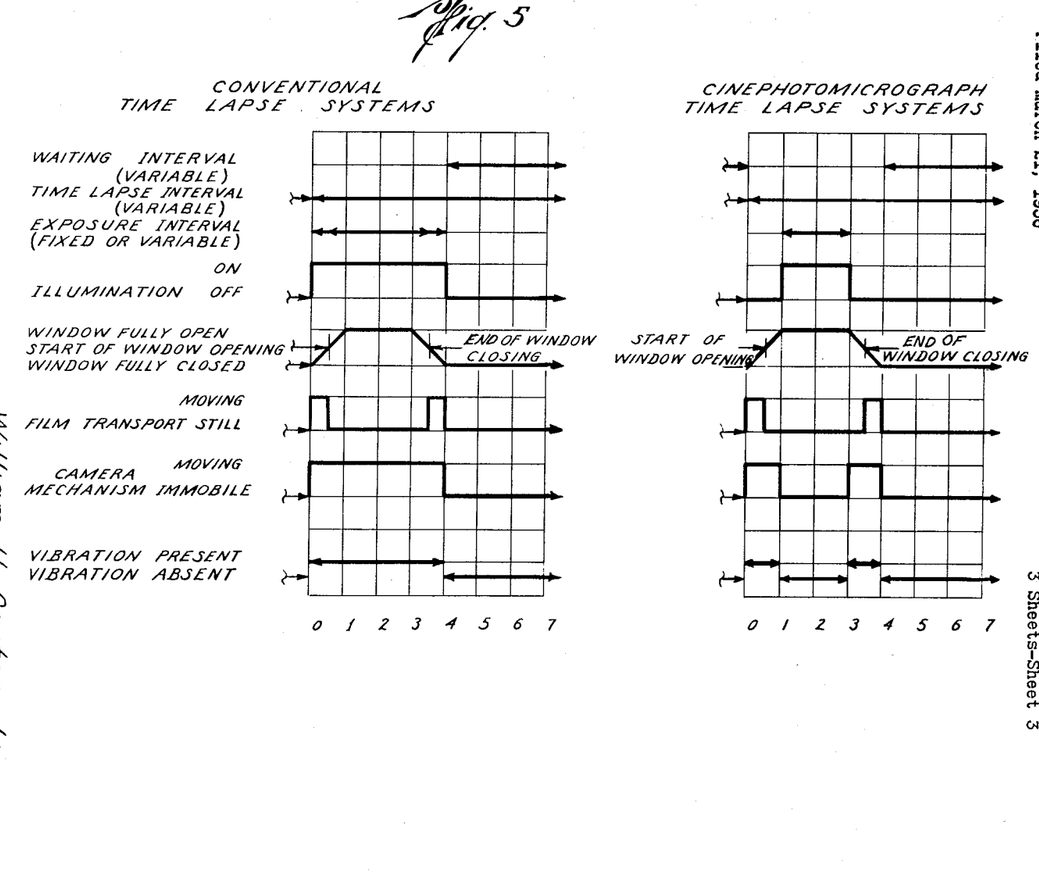
Fig. 5 is a comparative diagram of a conventional time lapse photographic system as compared with the time lapse photographic system obtainable with this invention.

In Fig. 5 charts are provided showing the cycles of conventional time lapse systems as compared with the cycles of the cinephotomicrograph time lapse systems of this invention. In both charts the length of cycle or time lapse interval has been selected as 7½ seconds, and a camera drive mechanism operation is shown on both charts requiring one second of operating time to move the shutter and transport the film during which film transport occurs during the first half of the second while the shutter moves without uncovering the window, while during the last half of the second the film transport has stopped as the shutter moves to uncover the window. Also one second of operating time is required to move the shutter to again close the window and to transport the film with the shutter covering the window during the first half of the second and rotating further during the second half of the second as film transport occurs.

In both charts the exposure interval is two seconds and the waiting time is thus 3½ seconds. However in the conventional system illumination is shown as extending variably from a period at least equal to the period from the time when the shutter first begins to uncover the window until the shutter first begins to cover the window, or for a longer period up to four seconds, the full running time of the camera drive. On the other hand in the system of this invention illumination takes place coincident with exposure or in 2 seconds.

The important difference resides in the period during which the camera drive runs and during which vibration occurs, which is four seconds in the case of the conventional system and in the system of this invention it is one second followed by a full stoppage period of two seconds during exposure, then followed by a period of one second further running time.

In these systems an important distinction should be noted in the fact that in the conventional system exposure time has to be less than running time as it occurs during part of running time, whereas in the system of this invention exposure time need have no relation to running time. For instance, at the expense of waiting time, the system of this invention, as charted, could increase exposure time to say five seconds if desired, or a period greater than all of running time in the conventional system, whereas exposure time in the conventional time is subject to the length of total running time.

In certain relationships of size, friction and speed, it becomes necessary to insure that the shaft 31 is braked against its momentum when a microswitch 68 or 69 falls into the cam slot 67, thereby preventing the cam 66 from rotating too far so as to carry on past a microswitch and thereby restoring the connection to be broken by such microswitch when in the cam slot.

This is accomplished by providing a conductor 86 on the opposite side of the switch 83 from the conductor 101, such conductor 86 having therein a selenium rectifier 88 for converting A.C. current to D.C. current and such conductor connecting the rectifier 88 with the conductor 100. Between the switch 83 and the rectifier 88 a conductor 87 is connected into the conductor 86, and such conductor 87, having a condenser 89 therein, extends to the conductor 99' as shown in Fig. 3.

Thus when the relay 64 is energized and the motor 65 runs, the condenser 89 is in series with the rectifier 88 and in a circuit across the power line conductors 51 and 52 and a charge is built up in the condenser 89. However when the relay 64 is de-energized the condenser 89 is in series with the windings of the motor 65 and as the condenser 89 discharges in this circuit a D.C. pulse acting as a magnetic brake locks the shaft 31 of the motor 65 against rotation so that the cam 66 is stopped with relation to a microswitch 68 or 69 and does not overtravel and lift the microswitch out of the cam slot.

A switch 90, normally held open, is provided in the conductor 98 between its junction with the conductor 57 and its junction with the conductor line 51' to be manually closed at any time to start an operative cycle of the invention, whereby an exposure can be made regardless of the fact that the arm 56 may occupy position between contacts on the disc 84. Also parallel connected service light plug receptacles 91 are provided in a circuit 92 across the conductors 51, 52 outwardly of a switch 60 in the power conductor line 51. Additionally a neon light 93 is provided across the conductors 51, 52 to indicate the presence of power in the power line 51, 52.

A neon light 97 is provided to give parallel indication of the functioning of the light 17. As an additional feature a switch 82 is provided which may be manually switched to the focus position shown in Fig. 3 to thereby provide light at any desired instant independently of the cyclic lighting of the invention. As a feature of construction a terminal strip 80 may be provided adjacent the length of exposure timer motor 70 to provide connection and identification in the circuits of the conductors 71, 72, 104, 71', 106, and 85.

As indicated diagrammatically in Fig. 1, a shaft 40 drives the claw 38 to move the film, and a shaft 46 is indicated in Fig. 2 as rotating the shutter 45. In Fig. 5 film transport in the cinephotomicrograph is shown as occurring in part in the first half-second of the time lapse interval and in part in the eighth half-second of the time lapse interval. However, since the transmission 32 drives both shutter shaft 46 and film transport shaft 40, and since it is merely a matter of conventional gear engagement in the transmission box 32 as to what point in time film movement may start with relation to shutter movement, all of the film movement can be set to take place continuously whereas only shutter movement must be split into two stages to take place immediately before or immediately after exposure. In this regard it is pointed out that the film movement should not be continuing while the shutter is in process of uncovering or covering the window but on the other hand both movements may be occurring simultaneously as long as the shutter is rotating without uncovering or covering the window.

Thus the plotted cycle may be altered by conventional transmission adjustment so that film movement and shutter rotation may take place together for one second, shutter rotation continue thereafter for one-half second during uncoverage of the window, stoppage and exposure then take place for two seconds, shutter rotation to close window take place for one-half second, after which the three and one-half second wait may occur. Or on the other hand the plotted cycle may be altered by conventional transmission adjustment where shutter rotation to uncover the window takes place for one-half second, stoppage and exposure takes place for two seconds, shutter rotation to close window takes place for one-half second, film transport and shutter rotation together occur for one second, and the waiting interval then takes place for three and one-half seconds.

Obviously by conventional transmission adjustment the time of film transport may be variously unequally divided in various proportions to take place in part before the shutter begins to uncover the window and in part after the shutter has covered the window, shutter movement being divided accordingly.

Other variations of construction and operation are obvious. For instance a selector circuit arrangement other than the fan switch and disc arrangement may be employed to give selectively the number of cycles or time lapse intervals to occur during a revolution of the shaft of the motor 54.

As a special feature of application the invention is extended to cover play back of an impressed film at the same rate or at a fractional or multiple rate at which the frames have been impressed. To this end the impressed film is rolled up on the reel 34 and extended over the rollers 35 and 36 to the reel 37. The same circuit and mechanism is then employed as shown in Figs. 3 and 4 with the exception that the light 17, or the light 94 and magnetic shutter arrangement, if optionally employed, is positioned within the camera 28 or in position to project the sensitized images through the window and upon a glazed glass screen or similar screen means, the camera being mounted on the stand 11 or on corresponding structure to project the images in direction upon the screen.

The invention is therefore not limited to the disclosures set forth hereinabove and shown in the drawings attached, but other variations and modifications are considered as well as such may fall within the broad spirit of the invention and within the broad scope of interpretation claimed and merited for the appended claims.

What is claimed is:

1. A cinephotomicrograph comprising in combination, a heavy stand, a camera mounted thereon providing a window and having a shutter therefor and also including film therein, a microscope on said stand adjustably spaced from said camera, a support for an object to be photographed spaced from said microscope on the opposite side thereof from said camera, a light spaced on the opposite side of said object from said microscope, a continuously running, interval timing motor having a circuit actuator rotatable therewith, a pre-determined number of circuits each successively closed by actuator contact and then broken within equally spaced apart time intervals between contacts, a circuit including therein a first normally open switch, and the drive motor for said camera, said camera drive motor having a transmission actuated thereby including a cam, a shutter actuator to close and open said window, and means to transport film over said window, a relay circuit energizable to close said first switch, a conductor extending from said circuit actuator, a first cam actuated circuit positioned by said cam in its initial stopped position to connect said relay circuit to said conductor and the closing of a time interval circuit by said circuit actuator completing circuit therethrough whereby the energized relay closes said first switch to start said camera drive motor, a second cam actuated circuit positioned by cam rotation to complete circuit through said first cam actuated circuit to said relay circuit to maintain said relay energized as said circuit actuator breaks contact, a continuously running, clutch equipped, exposure timer motor circuit, a second, normally open switch circuit connected when closed to complete circuit to said relay, an exposure timer assembly connectable to, but normally held disconnected from, said clutch for rotation by said exposure timer motor and including an exposure timer adapted to be set to rotate a predetermined time of angular travel with said assembly to close said second switch, a pair of circuits in parallel, one comprising a third cam actuated circuit including a solenoid therein and the other circuit including said light therein, said third cam actuated circuit being connected in closed circuit to said first cam actuated circuit upon cam rotation to break relay circuit contact therewith to stop said camera drive motor, and said solenoid being energized in such closed circuit to move said exposure timer assembly into clutch engaged position to rotate with said exposure timer motor during the period of time exposure and while said stopped camera drive motor cannot impart vibration through said heavy stand to the object being photographed until said exposure timer closes said second switch to energize said relay to start up said camera drive motor to rotate said cam to position said first cam actuated circuit to closedly connect said second cam actuated circuit and said relay circuit, further cam rotation returning said cam to initial position breaking said second cam actuating circuit and the occurrence of a successive time interval circuit closure initiating a successive cycle as above, upon initial starting said camera drive motor actuating said transmission to move film over said window and then to open said shutter, upon stoppage of said camera drive motor said light impressing said film during the period of exposure timer rotation, upon re-starting said camera drive motor actuating said transmission to close said shutter and then to move film until stopped at end of cycle.

2. A cinephotomicrograph comprising in combination, a heavy stand, a camera drive unit mounted thereon and including a camera having a window therein, a shutter for opening and closing said window, and film movable over said window, a circuit actuated, camera drive motor having a transmission actuated thereby including a cam, a shutter actuator to open and close said shutter, and means to move film over said window, a microscope on said stand adjustably spaced from said camera, a support for an object to be photographed spaced from said microscope on the opposite side thereof from said camera, a light spaced on the opposite side of said object from said microscope, an electrically actuated time lapse drive control unit including electric selector circuit means successively individually circuit connectable to said camera drive motor circuit to empower said camera drive motor circuit to start said camera drive motor, a continuously running, interval timer motor operable over a predetermined period of time to successively close and open said selector circuit means at equally spaced apart time lapse cycles, said camera drive motor circuit being cooperative with said cam after closure of the selector circuit means to continue operation of said camera drive motor for a predetermined interval and then actuated by said cam to stop said camera drive motor, a continuously running clutch equipped, exposure interval timer motor circuit, exposure interval timing means operable when clutch engaged to be driven by said exposure interval timer motor, a normally open circuit adapted to be closed by said exposure interval timing means and connected when closed to complete circuit to said camera drive motor circuit to re-start said camera drive motor, parallel circuits both actuated by said camera drive motor circuit upon camera drive motor stoppage with one circuit including said light and with the other circuit including means therein to connect said exposure interval timing means to said exposure interval timer motor to be driven thereby, while said stopped camera drive motor cannot impart vibration through said heavy stand to the object being photographed, to close said normally open circuit to start said camera drive motor, said camera drive motor circuit then being cooperative with said cam to continue operation of said camera drive motor over a predetermined interval and then being actuated by said cam to stop said camera drive motor at the end of a time lapse cycle, upon initial starting said camera drive motor actuating said transmission to move film over said window and then to open said shutter, upon stoppage of said camera drive motor said light impressing said film during the period said exposure interval timing means is being driven, upon re-starting said camera drive motor actuating said transmission to close said shutter and then to move film until stopped at end of cycle.

3. In a camera the combination of a housing, reeled film divided in frame lengths therein, a window, a shutter to open and close said widow, a camera drive motor including a cam driven thereby and a circuit therefor having therein a first normally open switch, means adapting said motor to transport said film to rotate said shutter to open and close said window and to transport film during a portion of shutter rotation to position a frame at a time over said window, a first and second cam actuated switch and a connecting circuit therebetween, a first continuously running motor and starter means driven thereby adapted to maintain circuit closed to said switch connecting circuit once each predetermined cycle of time during which said camera drive motor runs to rotate said shutter to open said window, stops during exposure, runs to rotate said shutter to close said shutter, runs during additional time to rotate said shutter during which time it transports film, and is stopped until said starter again completes circuit to maintain circuit closed to said switch connecting circuit, a second continuously running motor including a normally disengaged clutch engageable to be driven thereby, a circuit including a relay energizable to close said first normally open switch, a circuit including a solenoid energizable to engage said clutch and an exposure light in circuit therewith, a circuit connected to said relay circuit and including a second normally open switch therein adapted to be closed after a predetermined time lapse interval of driving engagement by said clutch as established upon motor-clutch engagement, a circuit adjacent said first cam actuated switch and closable thereby, said cam being adapted to position said second cam actuated switch to complete circuit to said relay when said starter closes circuit to said switch connecting circuit and said relay closing said first normally open switch to start said camera drive motor to rotate said cam to position said first cam actuated switch to close said adjacent circuit just prior to said starter breaking circuit whereby circuit is maintained through said relay and said camera drive motor runs to rotate said shutter until said window is opened, at the end of window opening said cam being adapted to position said second cam actuated switch to break contact with said relay circuit and establish contact with said solenoid and light circuit whereby said camera drive motor is stopped and said clutch is engaged to close said second normally open switch during said time lapse interval corresponding with the interval of film exposure to said light whereupon said relay is energized to start said camera drive motor to rotate said cam, and said cam being adapted to actuate said second cam actuated switch to break contact with said solenoid and light circuit and establish contact with said relay circuit whereby said camera drive motor continues to run to close said shutter, said cam then being adapted to break contact between said first cam actuated switch and said adjacent circuit to break circuit to said relay whereby said camera drive motor remains stopped until said starter again completes circuit as the predetermined time cycle ends.

4. In a camera the combination of a housing, reeled film divided in frame lengths therein, a window, a shutter to open and close said window, a camera drive motor including a cam driven thereby and a camera drive motor circuit therefor having therein a first normally open switch, a transmission adapting said camera drive motor to transport said film to rotate said shutter to open and close said window and to transport film during a portion of shutter rotation to position a frame at a time over said window, an electrically actuated time lapse drive control unit including electric selector circuit means successively individually circuit connectable to said camera drive motor circuit to empower said camera drive motor circuit to start said camera drive motor, a continuously running, interval timer motor operable over a predetermined period of time to successively close and open said selector circuit means at equally spaced apart time lapse cycles, said camera drive motor circuit being cooperative with said cam after closure of a selector circuit means to continue operation of said camera drive motor for a predetermined interval and then actuated by said cam to stop said camera drive motor, a continuously running clutch equipped, exposure interval timer motor, exposure interval timing means operable when clutch engaged to be driven by said exposure interval timer motor, a normally open circuit adapted to be closed by said exposure interval timing means and connected when closed to complete circuit to said camera drive motor circuit to re-start said camera drive motor, parallel circuits both actuated by said camera drive motor circuit upon camera drive motor stoppage with one circuit including a light and with the other circuit including means therein to connect said exposure interval timing means to said exposure interval timer motor to be driven thereby while said camera drive motor is stopped, and at the end of said time interval said exposure interval timing means closing said normally open circuit to start said camera drive motor, said camera drive motor then being cooperative with said cam to continue operation of said camera drive motor over a predetermined interval and then being actuated by said cam to stop said camera drive motor at the end of a time lapse cycle, upon initial starting said camera drive motor actuating said transmission to move film over said window and then to open said shutter, upon stoppage of said camera drive motor said light impressing said film during the period said exposure interval timing means is being driven, and upon re-starting said camera drive motor actuating said transmission to close said shutter and then to move film until stopped at end of cycle.

5. In a camera provided with a light the combination of a housing, reeled film divided in frame lengths therein, a window, a shutter to open and close said window, a camera drive motor including a cam driven thereby and a camera drive motor circuit therefor having therein a first normally open switch, a transmission adapting said camera drive motor to rotate said shutter to open and close said window and to transport film during a portion of shutter rotation to position a frame at a time over said window, an electrically actuated time lapse drive control unit including electric selector circuit means successively individually circuit connectable to said camera drive motor circuit to empower said camera drive motor circuit to start said camera drive motor, a continuously running, interval timer motor operable over a predetermined period of time to successively close and open said selector circuit means at equally spaced apart time lapse cycles, said camera drive motor circuit being cooperative with said cam after closure of a selector circuit means to continue operation of said camera drive motor for a predetermined interval and then actuated by said cam to stop said camera drive motor, a continuously running clutch equipped, exposure interval timer motor, exposure interval timing means operable when clutch engaged to be driven by said exposure interval timer motor, a normally open circuit adapted to be closed by said exposure interval timing means and connected when closed to complete circuit to said camera drive motor circuit to restart said camera drive motor, a circuit actuated by said camera drive motor circuit upon camera drive motor stoppage and including means therein to connect said exposure interval timing means to said exposure interval timer motor to be driven thereby and to effectuate light exposure during the interval said film is exposed to said light while said camera drive motor is stopped, and at the end of said time interval said exposure interval timing means closing said normally open circuit to start said camera drive motor, said camera drive motor then being cooperative with said cam to continue operation of said camera drive motor over a predetermined interval and then being actuated by said cam to stop said camera drive motor at the end of a time lapse cycle, upon initial starting said camera drive motor actuating said transmission to move film over said window and then to open said shutter, upon stoppage of said camera drive motor said light impressing said film during the period said exposure interval timing means is being driven, and upon re-starting said camera drive motor actuating said transmission to close said shutter and then to move film until stopped at end of cycle.

References Cited in the file of this patent

UNITED STATES PATENTS

| | | |
|---|---|---|
| 1,759,630 | Rinaldy | May 20, 1930 |
| 1,794,499 | Rosenberger | Mar. 3, 1931 |
| 1,984,420 | Moulin et al. | Dec. 18, 1934 |
| 1,986,398 | Ireland | Jan. 1, 1935 |
| 2,156,440 | Veber | May 2, 1939 |
| 2,269,373 | Kitroser | Jan. 6, 1942 |
| 2,290,626 | Bosomworth | July 21, 1942 |
| 2,353,154 | Fowler | July 11, 1944 |
| 2,409,358 | Kaplan | Oct. 15, 1946 |
| 2,430,975 | Crowley | Nov. 18, 1947 |
| 2,496,574 | Boger | Feb. 7, 1950 |
| 2,742,834 | Kondolf | Apr. 24, 1956 |
| 2,761,099 | Berry et al. | Aug. 28, 1956 |
| 2,767,332 | Willard | Oct. 16, 1956 |

FOREIGN PATENTS

| | | |
|---|---|---|
| 621,183 | France | Jan. 31, 1927 |
| 385,716 | Great Britain | Jan. 5, 1933 |